Feb. 3, 1959  R. A. KRAFT  2,872,510
TELEVISION RECEIVER
Filed April 28, 1953
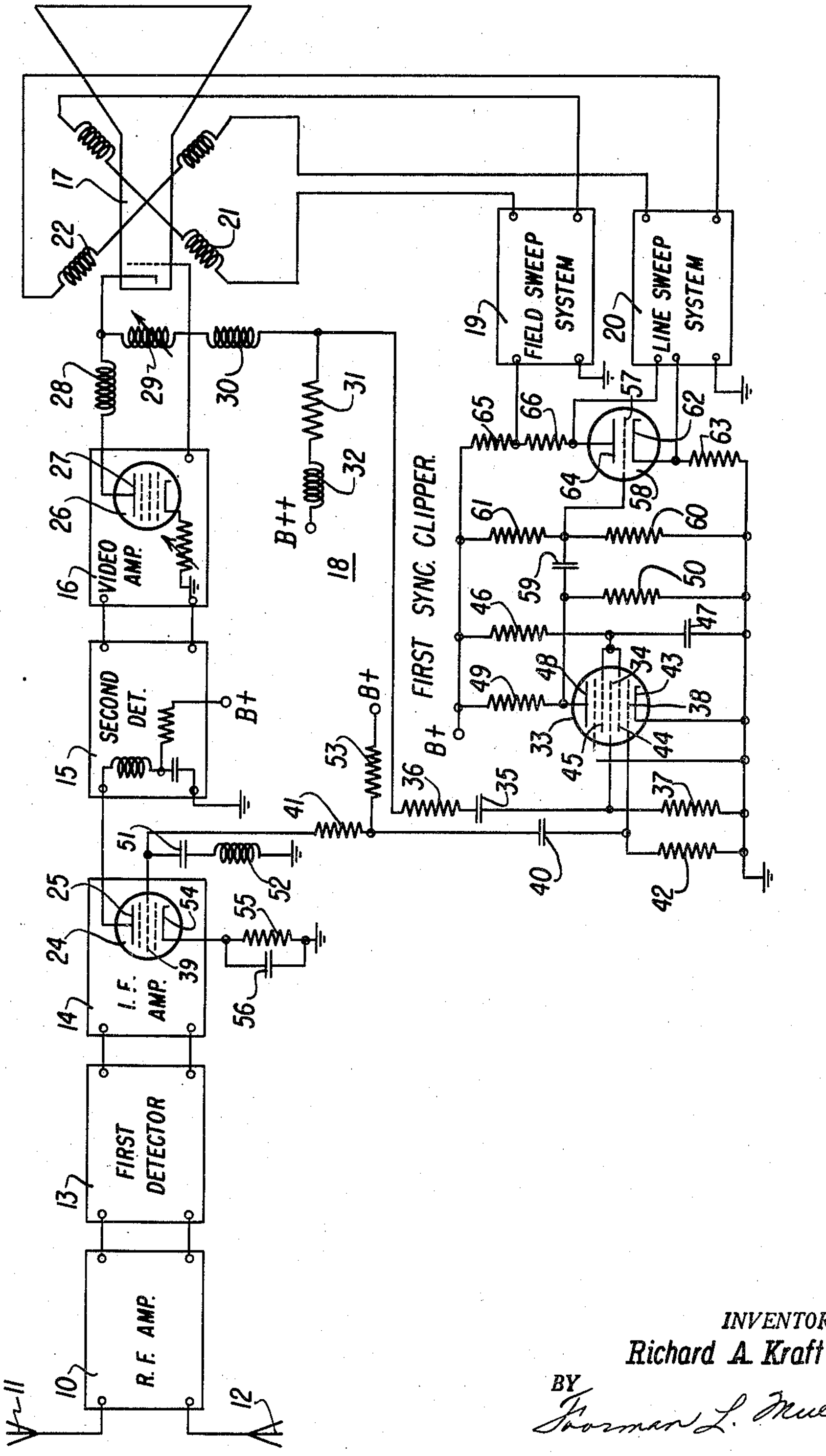
INVENTOR.
Richard A. Kraft
BY Norman L. Mueller
Atty.

United States Patent Office 2,872,510
Patented Feb. 3, 1959

2,872,510

TELEVISION RECEIVER

Richard A. Kraft, Chicago, Ill., assignor to Motorola, Inc., Chicago, Ill., a corporation of Illinois Application April 28, 1953, Serial No. 351,615

1 Claim. (Cl. 178—7.3)

This invention relates generally to television receivers, and more particularly to a television receiver that is constructed in a new and improved fashion so that the synchronizing signal separator stage therein is not subject to paralysis by high level noise disturbances and the like that sometimes accompany the televsion signals utilized by the receiver.

The present-day television signal is standardized to include video frequency components occurring in a succession of line and field trace intervals, and the video components are interposed with line and field synchronizing components occurring during line and field retrace intervals. The synchronizing components are pedestalled on associated blanking components so as to extend into the blacker-than-black region beyond the maximum amplitude of the video frequency components. Present-day television receivers, accordingly, are provided with a synchronizing signal separator stage which comprises an electron discharge device biased to clip the high amplitude synchronizing components from the television signal and translate only the synchronizing components to the line and field sweep systems of the receiver for synchronizing purposes. It is also a usual practice to construct the input circuit of the synchronizing signal separator discharge device so that it responds to the peaks of the synchronizing components to render the discharge device self-biasing, at least to some extent, so that it clips the synchronizing signal components at a fixed level within the television signal despite slight variations in intensity of the various television signals utilized by the receiver. Such synchronizing signal separators require a time-constant circuit including a series coupling capacitor, and difficulties have been encountered in the past in overcoming the adverse effects on the synchronizing process of the receiver of high amplitude noise bursts sometimes received concurrently with the television signals.

To restate the above more specifically, in usual television receivers the synchronizing components and noise bursts are supplied to the synchronizing signal separator with positive-going polarity. A noise burst with material energy content excessively charges the coupling capacitor in the above-mentioned self-biasing circuit, and subsequent discharge of this capacitor biases the synchronizing signal separator discharge device to a non-conductive state for a time interval determined by the time constant of the self-biasing input circuit. This causes synchronization to be lost until the capacitor regains its normal charge condition since no synchronizing components are translated to the sweep systems of the receiver during such intervals. Since the input circuit of the separator discharge device must have a certain minimum time constant in order that the proper self-biasing action may be achieved in response to the peaks of the synchronizing components, it is infeasible to reduce the time constant of the input circuit to a sufficiently low value to overcome the deleterious effects of the aforementioned noise bursts.

It is an object of the present invention to provide an improved television receiver which includes a self-biased amplitude clipper synchronizing signal separator, and which is constructed so that the adverse effect of the noise disturbances on the clipping level of the synchronizing signal separator is materially reduced.

A further object of the invention is to provide such a new and improved television receiver which includes an amplitude clipper synchronizing signal separator having a self-biasing input circuit with a series coupling capacitor and which is constructed so that high amplitude noise disturbances are incapable of producing any excessive charge on such capacitor so as to paralyze the separator.

Yet another object of the invention is to provide such an improved television receiver which includes a self-biasing synchronizing signal separator, and which is constructed so that the adverse effects of noise disturbances are eliminated for varying intensities of the television signals received and utilized by the receiver without affecting to any appreciable extent the proper functioning of the separator and without the need for any manual adjustment to compensate for such varying intensities.

A feature of the invention is the provision of a television receiver that includes a synchronizing signal discharge device having a plurality of control electrodes in which the synchronizing components of a received television signal are supplied to one of the control electrodes with positive-going polarity through a self-biasing network; and in which only the noise components of received television signals are derived, even though such signals may have varying intensities, and are supplied to a second control electrode to render the discharge device non-conductive for the duration of each such noise component.

Another feature of the invention is the provision of an improved superheterodyne television receiver in which the screen electrode of an intermediate frequency discharge device in the receiver, having non-linear characteristics for signal amplitudes corresponding to the peak amplitudes of the aforementioned noise bursts, is coupled to the synchronizing signal separator of the receiver; and in which the screen electrode is bypassed to ground for the intermediate frequency, so that only negative-going noise components are supplied thereby to the separator to render it non-conductive for the duration of each such component.

The above and other features of the invention which are believed to be new are set forth with particularity in the appended claim. The invention itself, however, together with further objects and advantages thereof may best be understood by reference to the following description when taken in conjunction with the accompanying drawing in which the single figure shows a television receiver constructed in accordance with the invention.

The television receiver of this invention is constructed to utilize a television signal including video components, synchronizing components having a peak amplitude exceeding that of the video components, and undesired noise components having peak amplitudes exceeding that of the synchronizing components. The receiver comprises a first amplifier having non-linear characteristics for signal amplitudes corresponding to the peak amplitudes of the aforesaid noise components, and which includes an output circuit in which only the noise components of the above mentioned television signal appear and with negative-going polarity. The receiver also includes a second amplifier which includes an output circuit in which the synchronizing and noise components of the aforesaid television signal appear and with positive-going polarity. An electron discharge device is provided for separating the synchronizing components from the rest of the television signal and the discharge device includes a plurality of control electrodes. A self-biasing network is coupled between the output circuit of the second amplifier and one of the control electrodes of the discharge device mentioned above, and the network has a selected time-constant and tends to paralyze and render the discharge device non-conductive in response to each of the positive-going noise components and for time intervals corresponding in each instance to the time-constant of the network. Finally, a network is provided that couples the output circuit of the first amplifier to another of the control electrodes of the aforementioned discharge device to render the device non-conductive for the duration of each of the noise components, thereby to prevent the above-mentioned paralysis thereof.

The television receiver illustrated in the accompanying drawing includes a radio frequency amplifier 10 having input terminals connected to an antenna circuit 11, 12 and having output terminals connected to a first detector or converter 13. The output terminals of the first detector are coupled through an intermediate frequency amplifier 14 of any desired number of stages to a second detector 15. The second detector, in turn, is coupled through a video amplifier 16, of one or more stages, to the input electrodes of a cathode-ray image reproducing device 17.

Video amplifier 16 is also coupled to a synchronizing signal separator indicated generally as 18 and the separator is connected to a field sweep system 19 and line sweep system 20. The output terminals of sweep systems 19 and 20 are connected respectively to the field deflection elements 21 and line deflection elements 22 of cathode-ray image reproducer 17.

The operation of the television receiver thus far described is well known. A television signal which includes video frequency components, line and field synchronizing components having a peak amplitude greater than the video components, and which also includes undesired noise components having peak amplitudes exceeding that of the synchronizing components, is intercepted by antenna circuit 11, 12 and amplified in radio frequency amplifier 10. The amplified television signal is heterodyned to the selected intermediate frequency of the receiver in first detector 13, and the resulting intermediate frequency signal is amplified in amplifier 14 and detected in second detector 15. Second detecetor 15 produces a composite video signal, and this signal is amplified in video amplifier 16 and supplied to image reproducer 17 to intensity modulate the cathode-ray beam therein in accordance with the image intelligence.

The line and field synchronizing components of the received television signal are separated from the composite video signal in separator 18, and these components are supplied to the line and field sweep systems 20, 19 to synchronize these systems and, therefore, the line and field deflection of the aforementioned cathode-ray beam in device 17 with the received television signal.

In this manner, reproducer 17 is enabled to reproduce the televised scene represented by the received television signal. The sound portion of the television receiver forms no part of the present invention, and for that reason has not been shown.

The last stage of intermediate amplifier 14 is shown to comprise an electron discharge device 24 of the pentode type, and this device has non-linear characteristics for signal amplitudes corresponding to the peak amplitudes of the aforementioned noise components. Device 24 has an anode 25 connected to a conventional output circuit, which in turn is coupled to second detector 15 in known manner. The final stage of video amplifier 16 is shown to include an electron discharge device 26. Device 26 incluudes an anode 27 connected to the positive terminal B++ of a source of uni-directional potential through an output circuit, the output circuit including series-connected peaking coils 28, 29 and 30; resistor 31, and choke coil 32.

Synchronizing signal separator 18 includes an electron discharge device 33 which constitutes a first synchronizing signal clipper. Device 33 has a control electrode 34 coupled to the junction of coil 30 and resistor 31 in the video amplifier output circuit through a self-biasing network. The self-biasing network comprises a series-connected capacitor 35 and resistor 36, with a grid-leak resistor 37 connected between the control electrode and ground. The device 33 also has a control electrode 38 which is coupled to the screen electrode 39 of intermediate frequency amplifier discharge device 24 through a series-connected capacitor 40 and resistor 41, control electrodes 38 being connected to ground through a grid-leak resistor 42. Device 33 also includes a cathode 43 directly connected to ground, a pair of screen electrodes 44, 45 connected through a resistor 46 to the positive terminal B+ of a source of uni-directional potential and by-passed to ground through a capacitor 47, and an anode 48 connected to the positive terminal B+ through a resistor 49 and to ground through a resistor 50.

The screen electrode 39 of discharge device 24 is by-passed to a point of reference potential or ground through a series-resonant circuit tuned to the intermediate frequency and which includes a capacitor 51 and a series-connected inductance coil 52. The last-mentioned screen electrode is connected to the positive terminal B+ of a uni-directional potential source through the resistor 41 and through a further resistor 53 in series therewith. The cathode 54 of discharge device 24 is connected to ground through a cathode resistor 55 shunted by a capacitor 56.

Anode 48 of device 33 is coupled through a coupling capacitator 59 to the control electrode 57 of a discharge device 58, the latter device constituting a second synchronizing signal clipper for the receiver. The control electrode of device 58 is connected to ground through a resistor 60 and to the positive terminal B+ through a resistor 61. The cathode 62 of discharge device 58 is connected to ground through a cathode resistor 63, and the anode 64 of that device is connected to the positive terminal B+ through a pair of series-connected resistors 65—66. The anode 64 and cathode 62 of device 58 are connected to line sweep system 20 to supply positive and negative-going line synchronizing pulses to the line sweep system to synchronize that system in a manner disclosed, for example, and claimed in copending application, Serial No. 242,527, filed August 18, 1951, now Patent No. 2,645,717, granted July 14, 1953, in the name of Albert W. Massman, entitled "Synchronization Circuit," and assigned to the present assignee. The junction of resistor 65 and 66 is connected to field sweep system 19 to supply field synchronizing components to the field sweep system. It is to be understood that the disclosure of the second synchronizing clipper 58, and its connection to the sweep systems, is merely for purposes of illustration, for clipper 33 may be connected to the sweep systems in any known manner.

The receiver is constructed so that the composite video signal appearing in the output circuit of device 26 of video amplifier 16 has its synchronizing components and associated noise disturbances extending in a positive-going direction. Device 26, in addition to functioning as a video amplifier, also acts as a noise clipper to some extent so that the positive polarity noise bursts appearing in its output circuit have limited amplitude. However, it has been found that the amplitude limited noise bursts in this output circuit still have sufficient amplitude and energy content to affect adversely the synchronizing process of the receiver unless some compensating means is provided. Discharge device 33 is biased by the self-biasing network 35–37 to clip the synchronizing components from the detected composite video signal in the video amplifier output circuit since these components alone have sufficient amplitude to overcome the bias of the device and be translated thereby. Moreover, network 35–37 responds to the peak intensities of the synchronizing components to vary the bias on device 33 for differing intensities of the composite video signal so that the synchronizing signal clipper will always clip at a selected level within the composite video signal.

Without compensation, the positive polarity noise bursts, appearing in the output circuit of video amplifier discharge device 26, cause control electrode 34 to be driven positive and coupling capacitor 35 in the aforementioned self-biasing network to become excessively charged due to the resulting grid current flow. Subsequent discharge of capacitor 35 through the self-biasing network biases device 33 in a negative direction to paralyze that device and render it non-conductive for intervals dependent, in each instance, on the time constant of the network. During such intervals, clipper 33 no longer translates the synchronizing components to the sweep systems and synchronization is lost until the charge of capacitor 35 regains its operating value. The present invention overcomes this condition in the following manner.

The high amplitude noise bursts received concurrently with the television signal are detected to some extent by screen electrode 39 in intermediate frequency amplifier device 24 due to the non-linear characteristics of that device at the extreme positive peaks of such noise bursts. Therefore, the bursts appear with negative-going polarity in the screen electrode output circuit of the device and, in accordance with the invention, are supplied to the control electrode 38 of device 33 through coupling capacitor 40. The function of resonant circuit 51, 52 is to bypass the screen electrode 39 to ground and prevent degeneration of the screen for the intermediate frequency signal, so that only the noise bursts are supplied to control electrode 38 to coupling capacitor 40. The use of the resonant circuit gives a sharp bypass to the intermediate frequency, and yet does not affect the noise bursts over the relatively broad band in which they occur. In this manner, the negative-going noise bursts are passed unattenuated to control electrodes 38 to perform their neutralizing function.

With the above described circuit, the composite video signal is supplied to control electrode 34 through self-biasing network 35–37 with the synchronizing components and noise bursts extending in a positive-going direction, and the noise bursts alone are supplied to control electrode 38 and extending in a negative-going direction. During the occurrence of each noise burst, the negative-going burst on control electrode 38 drives clipper 33 to cut off, and self-biasing network 35–37 cannot readjust the bias immediately due to the time constant involved, so that the device remains non-conductive for the duration of such burst. Since the bursts on control electrode 38 maintain device 33 non-conductive, control electrode 34 does not draw grid current for the duration of such bursts and no charge is experienced by capacitor 35 with the resulting adverse biasing action described above.

Device 33 is self-biased by network 35–37 and, since device 24 supplies negative-going noise bursts but no video components or synchronizing components to control electrode 38 regardless of the actual signal intensity, clipper 33 functions efficiently and is immune to noise paralysis regardless of intensity variations in the received television signal. Anode 48 of clipper 33 is connected to ground through resistor 50 to reduce the anode voltage and provide a measure of top clipping for the synchronizing pulses. Therefore, device 33 clips the synchronizing components and supplies them to device 58 for further clipping and for application to sweep systems 19 and 20.

With the present invention, in the presence of noise, the synchronizing clipper 33 is merely rendered inoperative so that synchronization is lost for a brief moment for the duration of each noise burst. However, the adverse effect of the noise on the self-biasing network to the synchronizing signal clipper is entirely removed and the resulting paralysis of the synchronizing signal separator is obviated. However, as mentioned above, screen electrode 39 of intermediate frequency amplifier discharge device 24 supplies only the noise components to clipper 33, since only those components are detected therein and the other components are bypassed to ground through series-resonant circuit 51, 52. This prevents any possibility of components other than noise ever reaching control electrode 34 of device 33, even though the intensity of the television signal changes, with resulting adverse effects on the operation of that device.

While a particular embodiment of the invention has been shown and described, modifications may be made and it is intended in the appended claim to cover all such modifications as fall within the true spirit and scope of the invention.

I claim:

In a superheterodyne television receiver for utilizing a television signal including video components and synchronizing components having peak amplitudes exceeding the amplitudes of the video component, such receiver further being subject to translate undesired noise components having peak amplitudes exceeding those of the synchronizing components, the combination of an intermediate frequency amplifier circuit including an electron discharge device having non-linear characteristics for signal amplitudes corresponding to the peak amplitudes of the noise components, said electron discharge device having a plurality of electrodes including a cathode and a screen grid electrode, a series tuned circuit connected between said screen grid electrode and said cathode, said tuned circuit being resonant at the intermediate frequency to bypass the same so that the noise components are detected at said screen grid electrode to appear across said tuned circuit, detector circuit means connected to said intermediate frequency amplifier circuit for deriving the synchronizing components and the noise components, circuit means connected to said detector circuit means for utilizing the synchronizing components, said circuit means having a circuit portion translating the synchronizing components and the undesired noise components with a given polarity, and further circuit means connected between said screen grid electrode and said circuit portion for applying the undesired noise components from said intermediate frequency amplifier to said circuit portion with a polarity to cause cancellation thereof in said circuit portion.

References Cited in the file of this patent

UNITED STATES PATENTS

| | | |
|---|---|---|
| 2,299,333 | Martinelli | Oct. 20, 1942 |
| 2,356,141 | Applegarth | Aug. 22, 1944 |
| 2,631,230 | Marsh | Mar. 10, 1953 |
| 2,736,769 | Macovski | Feb. 28, 1956 |
| 2,791,627 | Thomas et al. | May 7, 1957 |
| 2,829,197 | Scott | Apr. 1, 1958 |

FOREIGN PATENTS

| | | |
|---|---|---|
| 515,675 | Belgium | Dec. 15, 1952 |

OTHER REFERENCES

Marks: Electronics, April 1952, pages 124–125.